United States Patent [19]

Harms

[11] Patent Number: 5,375,640
[45] Date of Patent: * Dec. 27, 1994

[54] PNEUMATIC TIRE FOR OFFROAD VEHICLES

[76] Inventor: Mark J. Harms, P.O. Box 983, Valley Center, Calif. 92082

[ * ] Notice: The portion of the term of this patent subsequent to Nov. 9, 2010 has been disclaimed.

[21] Appl. No.: 112,348

[22] Filed: Aug. 27, 1993

Related U.S. Application Data

[63] Continuation-in-part of Ser. No. 848,498, Mar. 9, 1992, Pat. No. 5,259,429.

[51] Int. Cl.⁵ .............................................. B60C 11/08
[52] U.S. Cl. ............................ 152/209 R; 152/209 B
[58] Field of Search ............ 152/209 R, 209 D, 209 B; D12/146–151

[56] References Cited

U.S. PATENT DOCUMENTS

| | | | |
|---|---|---|---|
| D. 256,008 | 7/1980 | Menin | D12/147 |
| D. 308,038 | 5/1990 | Guidry . | |
| D. 317,187 | 5/1991 | Suzuki | D12/147 |
| D. 323,135 | 1/1992 | Thomas | D12/151 |
| 4,383,567 | 5/1983 | Crum et al. . | |
| 4,480,672 | 11/1984 | Marshall et al. . | |
| 4,534,392 | 8/1985 | Bonko et al. . | |
| 4,791,971 | 12/1988 | Shinn . | |
| 4,982,773 | 1/1991 | Bonko | 152/209 |

FOREIGN PATENT DOCUMENTS 1908257 9/1969 Germany .
0143108 7/1985 Japan .

OTHER PUBLICATIONS

"Tread Design Guide"; 1990; p. 230.
Dick Cepek, 1987, Offroad Catalog, pp. 41–44.
Onza Porcupine "Mountain Bike Action", p. 68, Jan. 1990.

*Primary Examiner*—Michael W. Ball
*Assistant Examiner*—Nancy T. Krawczyk
*Attorney, Agent, or Firm*—Kerkam, Stowell, Kondracki & Clarke

[57] ABSTRACT

An all terrain vehicle tire has an improved tread including primary lugs arranged in sets equally spaced around the periphery of the tire on each side of the tire centerline with each set including a long lug and a short lug, with the sets on opposite sides of the centerline being offset substantially one half the pitch of the lug sets. At least the long lugs include an elongated central body portion extending at a first acute angle with respect to the centerplane and each of the primary lugs including an inner end directed at a second smaller acute angle relative to the centerplane and an outer end extending over and onto the shoulder of the tire at an obtuse angle with respect to the centerplane. A plurality of secondary lugs in the form of tapered knobs may be located between each of the primary lugs of each set with at least one secondary lug between each adjacent pair of primary lugs being located on the shoulder portion of the tire.

19 Claims, 4 Drawing Sheets

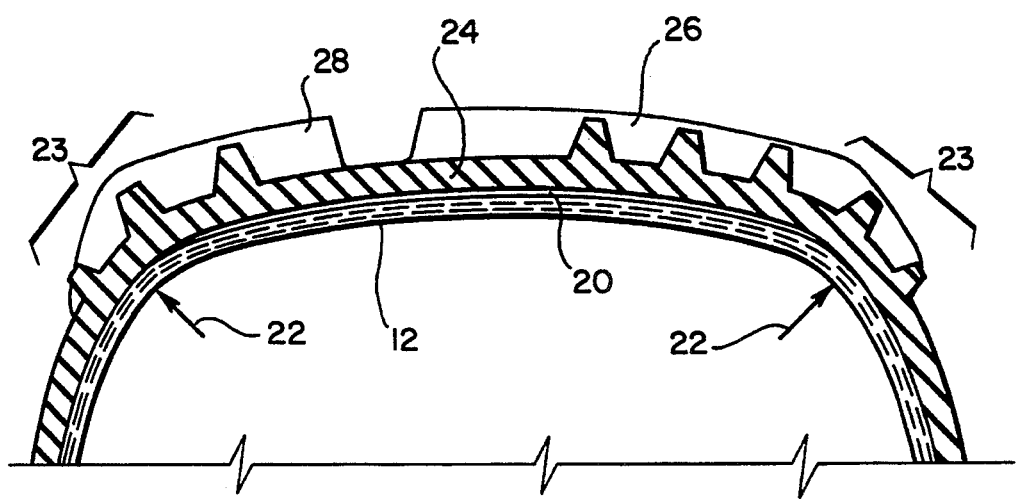
FIG. 4
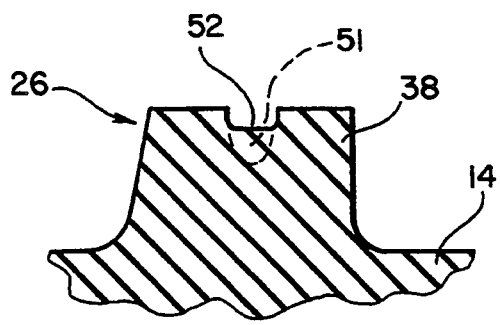
FIG. 5
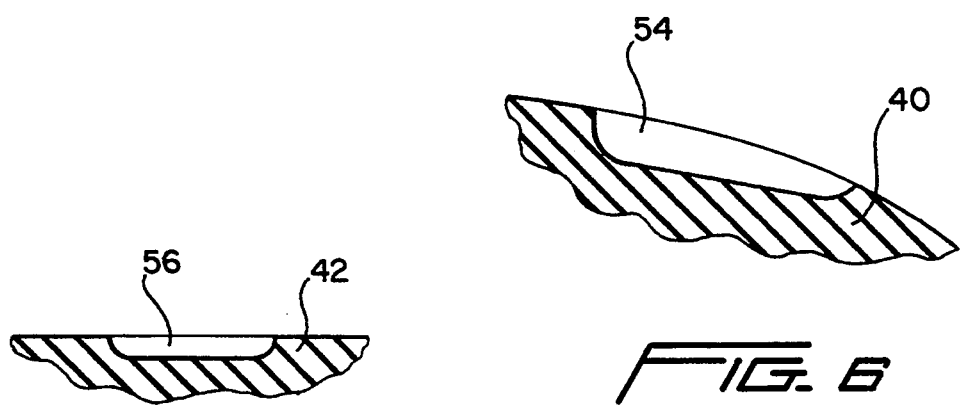
FIG. 6
FIG. 7

PNEUMATIC TIRE FOR OFFROAD VEHICLES

REFERENCE TO RELATED APPLICATION

This is a continuation-in-part of my copending application Ser. No. 07/848,498 filed Mar. 9, 1992, now U.S. Pat. No. 5,259,429.

BACKGROUND OF THE INVENTION

1. Field of the Invention

This invention relates to pneumatic tires for use on offroad vehicles, and more particularly to improved pneumatic tires especially suitable for use on all terrain-type vehicles.

2. DESCRIPTION OF THE PRIOR ART

Pneumatic tires designed primarily for offroad vehicles are well known and normally incorporate a tread designed to provide high traction in soft ground such as frequently encountered by farm tractors, graders and other heavy equipment. Such tread designs conventionally employ a system of elongated lugs emanating from each lateral edge of the tread and extending to a position near the vertical centerplane of the tire, with the lugs emanating from opposite sides of the tire cooperating to form a generally herringbone tread pattern. To provide the necessary traction for operating heavy equipment and pulling heavy loads, the lugs are relatively deep and designed to bite into the ground surface. The generally herringbone arrangement of the lugs tends to expel the earth laterally of the tire to facilitate the biting action and prevent the lugs from filling with earth and losing traction. Examples of such known tread designs may be found in U.S. Pat. Nos. 4,791,971; 4,534,392; 4,480,622; and 4,383,567.

While all terrain vehicles (ATVs) are normally operated off the road, their relatively light weight and low center of gravity, as well as their speed of operation and maneuverability, make the known tractor tire tread designs such as those disclosed in the above U.S. patents generally unsatisfactory for use on such vehicles. Although effective straightline or drawbar traction is required to enable an ATV to traverse rough and hilly terrain as well as mud, sand and snow, substantial lateral traction is also required to enable maneuverability of the vehicle. Further, minimum power or pulling traction, or even braking is frequently employed during maneuvering when maximum lateral traction is required for vehicle stability. Conventional off road tractor tire tread designs are particularly ineffective in providing lateral stability during low wheel torque or braking, and during maneuvering. It is, therefore, an object of the present invention to provide an improved pneumatic tire for use on off-the-road vehicles.

Another object is to provide an improved pneumatic tire having improved traction characteristics for enhanced pulling and for maneuvering of off-the-road vehicles.

Another object is to provide a pneumatic tire particularly useful for ATVs and having an improved tread design which provides both improved drawbar traction and lateral stabilization or traction during maneuvering.

SUMMARY OF THE INVENTION

In the attainment of the foregoing and other objects and advantages, an important feature of the invention resides in providing a conventional ATV tire carcass with an improved tread including a plurality of sets of elongated primary lugs extending from a location overlapping the shoulder portion of the carcass sidewall inwardly toward the vertical centerplane of the tire from each side of the tire. Each set of elongated lugs includes a long lug which extends at least substantially to and preferably in overlapping relation with the tire centerplane and a shorter lug extending inwardly a shorter distance toward the vertical centerplane.

Each elongated lug includes a lateral stabilizing portion extending in overlapping relation to the shoulder portion of the sidewall of the tire and at an angle relative to the body of the lug which tends to retard the flow of mud, sand, snow or the like laterally of the tire. The sets of lugs on opposite sides of the tire are in offset relation circumferentially relative to one another a distance approximately equal to one half the pitch of the primary lug sets around the tire circumference.

The tread further includes a plurality of secondary lugs which may be generally frustoconical or pyramid-shaped projections located between each adjacent pair of elongated lugs on each side of the tire, including a plurality of such pyramid-shaped lugs integrally molded on and projecting outwardly from the shoulder portion of each sidewall of the tire between the lateral stabilizing portion of each adjacent pair of elongated lugs. Such projections penetrate and provide resistance to the flow of soil laterally between adjacent elongated lugs, with the projections located on the shoulder providing increased lateral stability during sharp maneuvering due to the low inflation pressure used and the resulting tendency of the tires to roll to engage more of the sidewall with the supporting ground surface. During such maneuvering, the angle of the lateral stabilizing portion of the elongated lugs is such as to present substantial resistance to the flow of soil between the lugs or, conversely, to present resistance to the tire moving laterally or sliding sideways over the support surface.

The sets of primary lugs on each side of the tire comprise two lugs including one long lug and one short lug equally spaced circumferentially from one another, with a plurality of sets of secondary lugs being located between adjacent elongated lugs of each set at least on the shoulder portion of the tire. If desired, selected ones of the secondary lugs may be in the form of raised lettering, or alternatively raised lettering may be employed in addition to the sets of secondary lugs.

BRIEF DESCRIPTION OF THE DRAWINGS

Other features and advantages of the invention will be apparent from the detailed description contained hereinbelow, taken in conjunction with the drawings, in which:

FIG. 4 is a fragmentary sectional view taken along line 4—4 of FIG. 3;

FIG. 5 is an enlarged fragmentary sectional view taken along line 5—5 of FIG. 3;

FIG. 6 is an enlarged fragmentary sectional view taken along line 6—6 of FIG. 3; and FIG. 7 is an enlarged fragmentary sectional view taken along line 7—7 of FIG. 3.

DESCRIPTION OF THE PREFERRED EMBODIMENT

Figure 1:
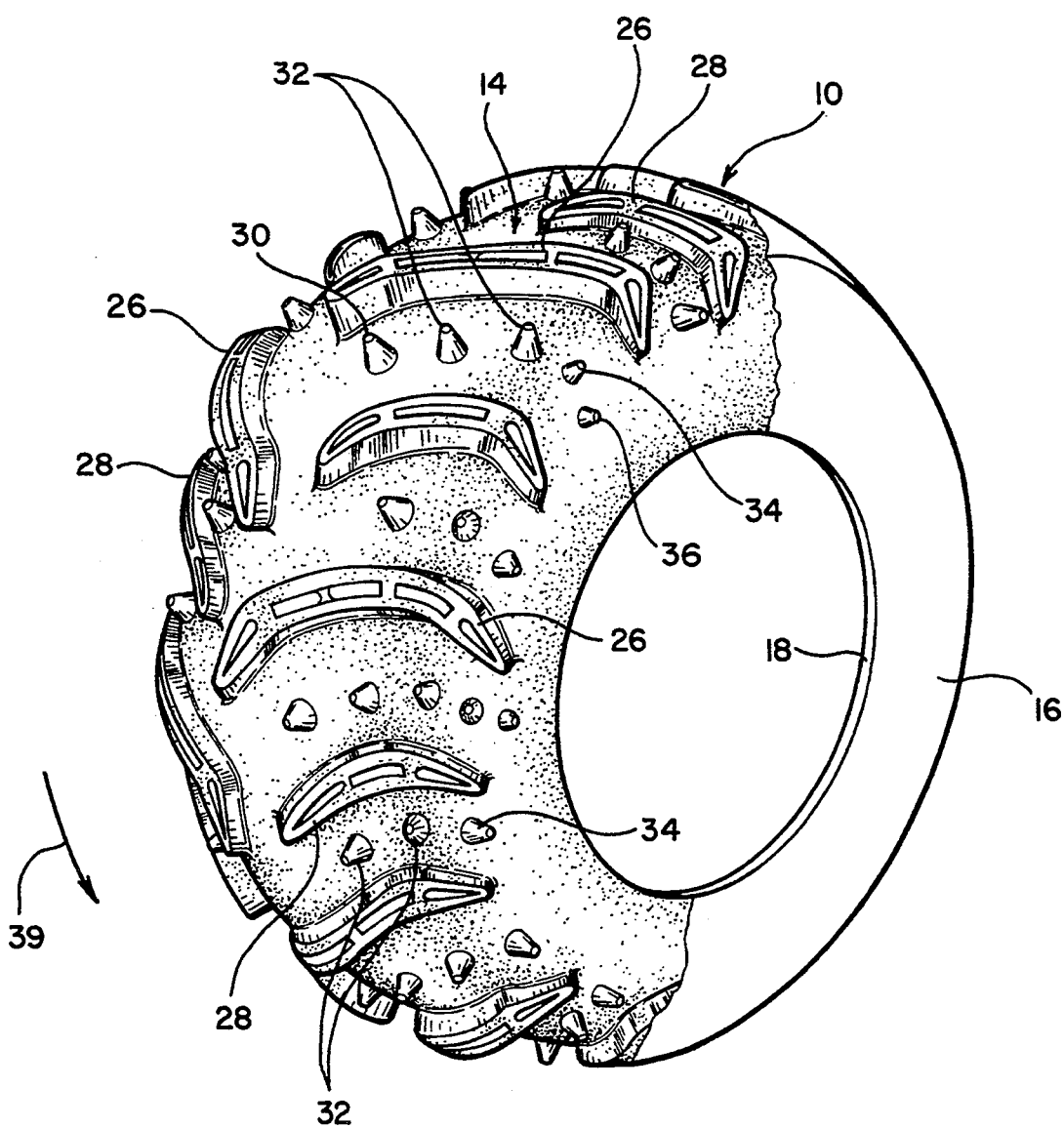
FIG. 1 is an isometric view of an ATV tire embodying the improved tire tread of this invention, it being understood that the tread pattern is repeated throughout the circumference of the tire as shown schematically by solid lines.
Figure 2:
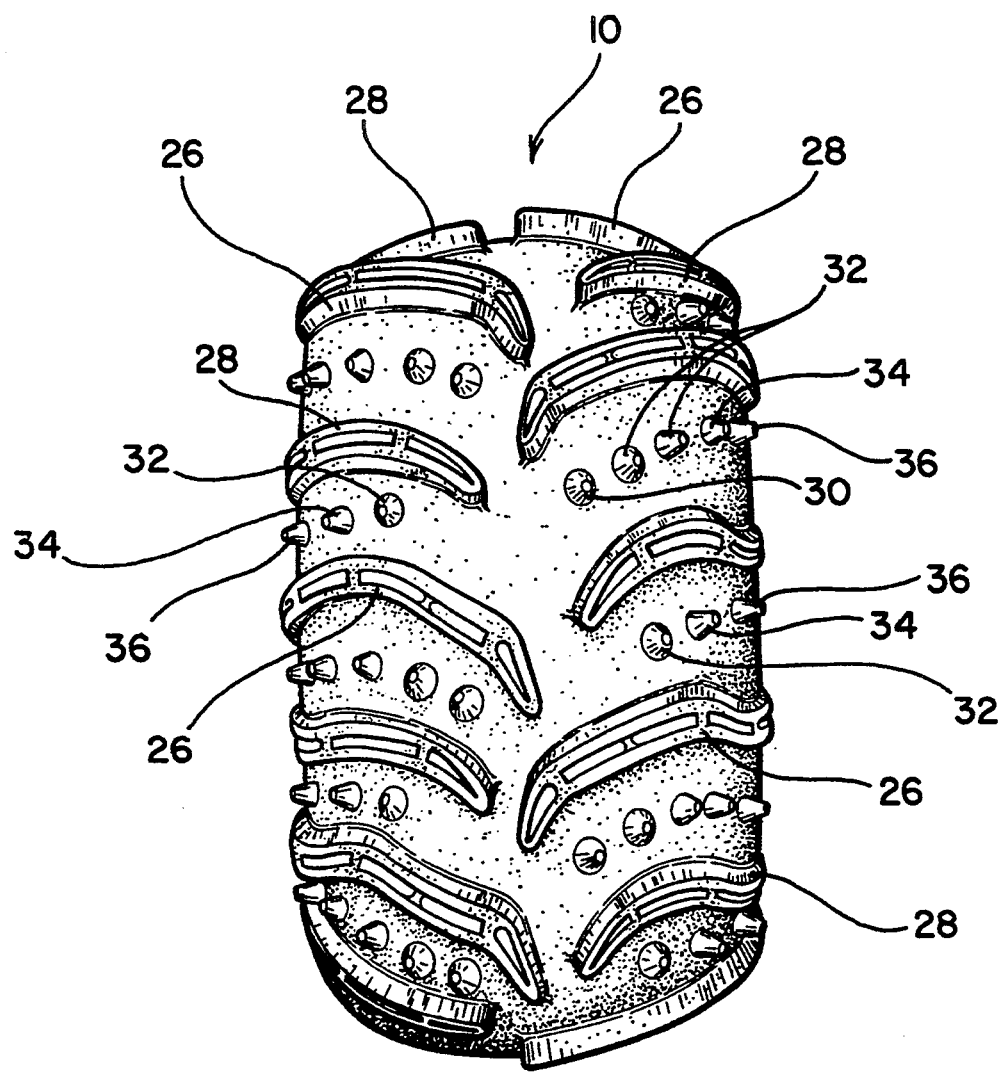
FIG. 2 is a front elevation view of a tire according to the invention.

Referring now to the drawings in detail, a tire intended for use on an ATV and embodying the present invention is designated generally by the reference numeral 10 and comprises a reinforced carcass 12 having a road engaging or tread portion 14 and generally radially inwardly extending opposed sidewall portions 16 each terminating in a reinforced bead 18. Carcass 12 may also include a conventional circumferentially extending reinforcing belt 20 as shown in FIG. 4. Tread portion 14 and sidewall portions 16 are joined at transition areas indicated generally in FIG. 4 by the arrows 22, with the portion of the sidewalls adjacent to the transition areas (indicated at 23 in FIG. 4) being referred to herein as the shoulder. A coating or layer of elastomeric material 24 extends over and is bonded to the outer surface of carcass 12.

The tire tread is molded with and forms an integral part of the elastomeric coating 24 and comprises a plurality of primary or elongated lugs including long lugs 26 and short lugs 28, and a plurality of outwardly extending, tapered secondary lugs 30, 32, 34 and 36 preferably in the general shape of a frustum of a pyramid or cone. The lugs 26 and 28 are arranged in sets around the tire tread, on each side thereof, with each set consisting, in sequence, of a long lug 26 and a short lug 28.

The elongated tread lugs 26 and 28 extend inwardly from the transition area or edge of the road engaging or tread portion 14 at each side of the tire. For purposes of this description, the transition line may be considered the intersection of the lateral edge of the tread portion 14 and the radially outer portion of the sidewall 16, as defined by a plane perpendicular to the tire axis, it being understood that such intersection is actually a smooth curved transition between the tread and the shoulder portion of the sidewalls. All elongated lugs extend inwardly from the transition area and are inclined in the direction of intended rotation of the tire toward the centerline of the tire, i.e., the line defined by the intersection of a plane perpendicular to the axis and located midway between the shoulders. The direction of intended rotation for forward movement of the ATV is indicated in FIG. 1 by the arrow 39.

Figure 3:
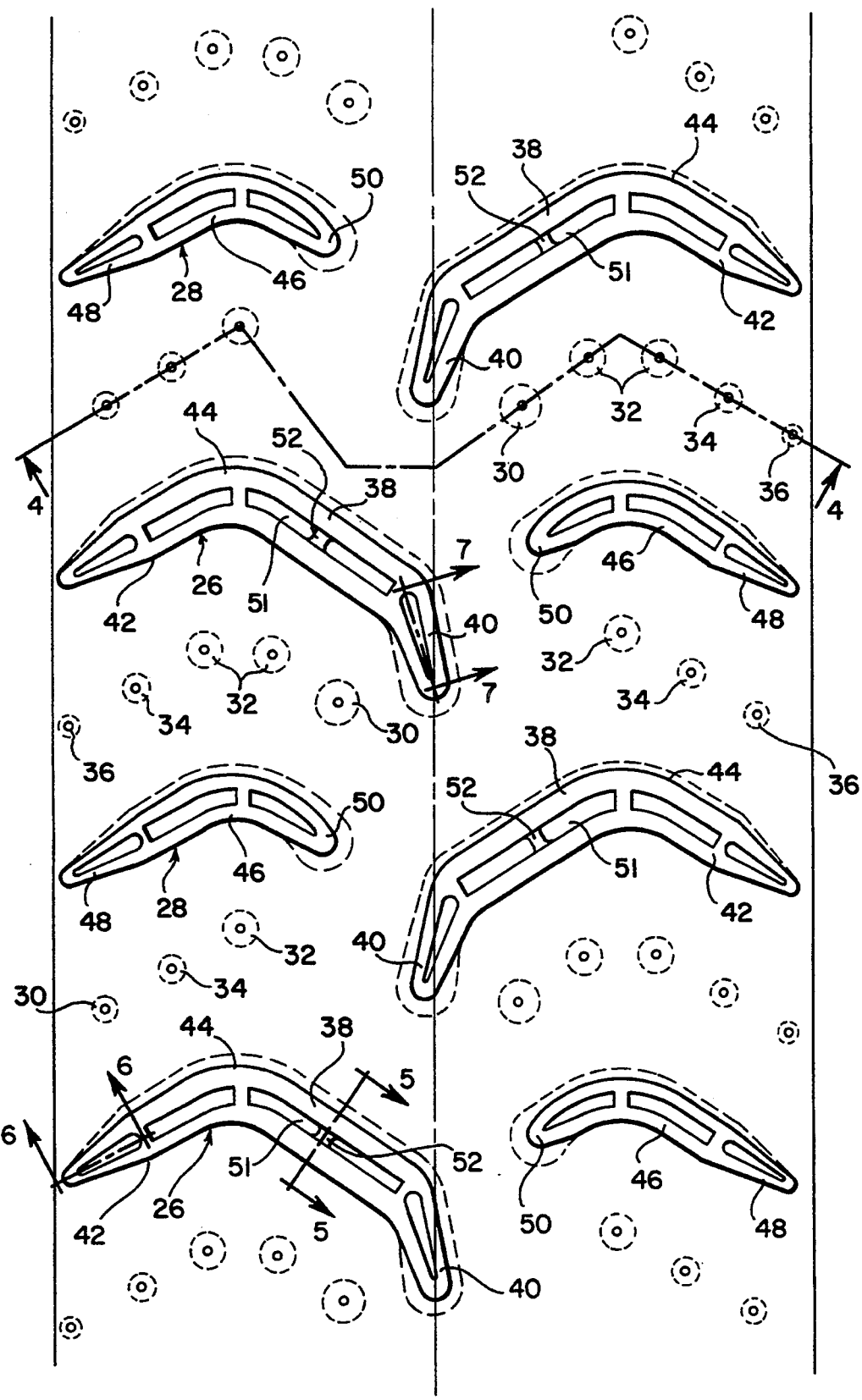
FIG. 3 is a simplified plan view of the tire tread showing the tread and shoulder portions generated into a common plane.

As most clearly illustrated in FIG. 3, the elongated lugs 26 each comprise an elongated, substantially straight body portion 38 extending from the vicinity of the transition line inward, an inner end portion 40 and an outer end portion 42. The outer end portions 42 extend downwardly, or inwardly along the shoulder portion 23 of sidewalls 16 and are inclined in a forward direction, again with reference to the direction of rotation of the tire during forward movement. The body portion 38 is inclined in a forward direction from the transition area toward the tire centerplane and the inner end portions 40 are also inclined, with respect to the body portion 38, in a forward direction and preferably extend to or slightly past the tire centerplane. Body portion 38 and outer end portion 42 preferably are joined in an arcuate or smooth curved portion 44. As can perhaps best be visualized from FIG. 1, the forwardly extending outer lug portions 42 provide lateral traction to stabilize a vehicle against skidding, particularly during maneuvering.

The short lugs 28 may be generally crescent shaped and include a body portion 46 overlying the transition portion 22 onto the tread and shoulder portions of the tire. The outer end portion 48 of lug 28 generally corresponds to and parallels outer end portion 42 of lug 26. Lugs 26 and 28 are substantially equally spaced around the periphery of the tire at the transition line. Lug 28 terminates at its inner end in a forwardly enclosed, tapered end portion 50 spaced inwardly of, but close to the transition line.

ATV tires conventionally are inflated at very low pressures to minimize the danger of damage upon engaging stones or other obstacles frequently encountered in the rough terrain in which such vehicles are operated. This low pressure, in combination with the relatively flexible carcass 12 conventionally employed in such tires, results in substantial lateral "rolling" of the tire during severe turning maneuvers. In a sharp turn, the tire will tend to roll or flex axially relative to the wheel rim in a direction to engage more of the tire sidewall on the outside of the turn with the supporting ground surface. During such maneuvers, the body portion 38 of the elongated lugs offer relatively low resistance to lateral skidding since they extend generally parallel to the direction of the resultant force tending to produce such skid movement. However, the forward angle of the segments 42 and 50 tend to resist the flow of soil between lugs on the inside of the skid and tend to bite into the soil on the side of the tire in the direction of skid. This antiskid feature is particularly effective where little or no power or even braking, is employed during maneuvering. Segments 42 and 50 also provide resistance to the flow of soft soil such as mud or sand, and snow laterally between the elongated lugs to thereby improve traction during straight driving movement. The antiskid feature is enhanced by the secondary lugs as described hereinbelow.

Still referring to FIG. 3, it is seen that the sets of elongated lugs which extend inwardly from opposite shoulders of the tire are offset circumferentially by approximately one half the circumferential length of each group, i.e., approximately one half the lug pitch. Preferably, the length of the body portion 38 of each long lug 26 is such that the inner end portion 40 extends to and generally along the vertical centerplane of the tire to provide a smoother ride when operating on hard terrain or road surfaces. Also, the inner end portions 40 of the lugs 26 are inclined at a smaller angle with respect to the tire centerline than the body portions 38 and this smaller angle of segments 40 provide a more uniform vibration-free rolling movement on hard surfaces or pavement. The segments 40 and 50 are tapered to a more narrow width adjacent their end, thereby providing easier penetration of soft soil or sand upon initial contact as the tire rolls over the ground. The reduced angle of segments 40 and 50 also tends to increase lateral skid resistance.

The skid resistant segments 42 and 48 located on the tire shoulder also are tapered from a maximum width at their junction with the body portions 38 and 46, respectively to their ends, with the height of sections 42 and 48 relative to the shoulder also diminishing from the body to their outer end. The staggered length of the lugs 26 and 28 provides an undulating open center channel around the periphery of the tire.

As most clearly seen in FIGS. 3 and 4, the center body segment 46 of the short lugs 28 extends to the edge or shoulder of the tire so that the outer end segment 48 of the short lugs are located entirely on the shoulder portion of the sidewalls. The body segments 38 of the lugs 26 terminate before reaching the shoulder, with the outer segments 42 of these lugs extending into the tread portion.

The body segments 38 of each of the elongated lugs 26 may extend at an acute angle of about 45° to 65° and preferably at about 55° with respect to the vertical centerplane of the tire. The inner segments may extend at an acute angle of about 10° to 25° and preferably about 15° with respect to the centerplane. The obtuse angle between the outer or shoulder segments 42 and 48, when generated into the track or tread shown in FIG. 3, and the centerplane may be about 110° to 130°, preferably about 120°. All angles are measured in the same direction from the longitudinal centerline of the respective lug segment to the centerplane on the trailing side of the lugs.

The elongated lugs 26 are provided with a trough-shaped channel formed in each of the three sections thereof to thereby present two "leading edges" for increased gripping traction. As shown in FIG. 3, each of the elongated body portions 38 are provided with an elongated channel-shaped relief trough 51, and a stiffening bridge 52 is provided at substantially the midpoint of channels 51. The depth of the relief channel and the stiffening bridge are illustrated in the sectional view of FIG. 5.

The outer end segments 42 and 48 of lugs 26, 28, respectively, are also provided with an elongated relatively deep relief trough 54 and the inner end segments 40, 50 are provided with a more shallow relief trough 56, with bridge sections 58 as shown in FIGS. 6 and 7, respectively. Channels of this general type are known in the art as shown, for example, in U.S. Pat. Des. No. 308,038.

As shown in FIG. 5, the leading edge of the body portion of each of the respective lugs 26, 28 extends in a plane generally perpendicular to the surface of the tire whereas the trailing edge is inclined at an angle, preferably about 10°, to the surface to provide reinforcement or rigidity to the respective lugs. The generally vertical front face of the lugs provide increased biting action for the lugs in soft soil.

In addition to the elongated lugs 26 and 28, the tire is provided with a plurality of secondary lugs in the form of tapered knobs or projections integrally molded with the elastomeric material of the tread at locations between each adjacent pair of the elongated lugs around the periphery of the tire. As shown in the drawings, the tapered knobs preferably are substantially frustoconical in shape and may be of different sizes depending upon the location on the tire. For example, the innermost cone-shaped lugs 30 located on the tread portion 14 between the lugs 26, 28 of each set of elongated lugs may be the largest and preferably have a height substantially equal to or slightly less than the height of the body 38. In the embodiment shown in the drawings, only one of the cone-shaped lugs 30 is provided between the lugs 26, 28 of each set, with the lugs 30 being spaced between the leading edge of lug 26 and the trailing edge of lug 28. It should be apparent that additional lugs 30 could be employed, if desired.

A pair of intermediate sized cone-shaped lugs 32 are located one on each side of the transition line of the tire in spaced relation to the leading edge of lug 26 and the trailing end of lug 28. A simple lug 32 is provided substantially on the transition line between the leading edge of lug 28 and the trailing edge of lug 26. Additional cone-shaped lugs 34, 36 are integrally molded on and project outwardly from the shoulder of the tire, with lugs 34 being smaller than lugs 32 and lugs 36 being smaller than lugs 34. Lugs 34 and 36 are located between adjacent outer end or antiskid segment of adjacent elongated lugs 26, 28, spaced radially inward along the shoulder and in a line generally parallel with the longitudinal centerline of lug segments 42 and 48. The arrangement, size and location of the tapered lugs relative to the elongated lugs and their position on the tread and shoulder portions of the tire is apparent from the isometric showing in FIG. 1. It should be apparent, however, that different arrangements and locations may be provided for the secondary lugs.

It should also be apparent that the conical lugs 30 and 32, located between adjacent elongated lugs, will provide resistance to the extrusion, or expulsion, of soft earth, sand or snow from between the lugs during normal travel and will augment traction in more firm soils or on hard surfaces. The secondary lugs 32, 34 and 36 adjacent and on the tire shoulder portion will provide traction and skid resistance in deep mud or sand during straight movement and will provide substantial resistance to skidding during maneuvering wherein the tire is distorted to bring the shoulder portion of the sidewall into contact with the terrain over which the vehicle is operated. Thus, the secondary lugs located both on the normal tread portion and in the shoulder portion of the tire substantially enhance maneuverability of all terrain vehicles both in very soft mud, snow or sand and in more firm soil conditions.

While I have disclosed and described preferred embodiments of my invention, I wish it understood that I do not intend to be limited solely thereto, but rather that I do intend to include all embodiments of the invention which should be apparent to one skilled in the art and which come within the spirit and scope of my invention.

I claim:

1. In a pneumatic tire for an off-the-road vehicle such as an all terrain vehicle or the like having a tread formed from an elastomeric material carried on a reinforced carcass and including an outwardly directed road engaging portion and sidewalls terminating in reinforced beads for mounting on a supporting wheel, the sidewalls including shoulder portions extending from said road engaging portion inwardly toward the beads, the tread extending over the road engaging portion and said shoulder portions completely around said tire, the improvement wherein said tread comprises a plurality of elongated primary lugs arranged in sets equally spaced around the periphery of the tire on each side of the circumferential centerplane of the tire, each said set of primary lugs including a long lug, and a short lug, with the sets of primary lugs on each side of the centerplane being offset circumferentially by a distance substantially equal to one half the circumferential pitch of the lug sets, each said long lug having an elongated central body portion extending at an acute angle with respect to said centerplane and each said primary lug having an outer end portion extending onto the adjacent shoulder portion at an obtuse angle relative to said centerplane and an inner portion extending at an acute angle relative to said centerplane which is less than the acute angle of said body portions, said body portions on each side of said centerplane being substantially parallel to one another.

2. The pneumatic tire defined in claim 1 wherein said body portion of each said long lug extends at an angle within the range of about 45° to 65° with respect to said centerplane.

3. The pneumatic tire defined in claim 2 wherein said inner end portion of each said primary lug extends at an angle of about 10° to 25° with respect to said centerplane.

4. The pneumatic tire defined in claim 2, wherein said outer end portion of each said primary lug extends at an angle of about 110° to 130° with respect to said centerplane.

5. The pneumatic tire defined in claim 1 further comprising a plurality of secondary lugs in the form of tapered knobs including at least one such secondary lug located in the road engaging portion and at least one such secondary knob located in the shoulder portion of the tread between each adjacent pair of primary lugs around the periphery of the tire on each side of the centerplane.

6. The pneumatic tire defined in claim 5 wherein said tread comprises at least three of said secondary lugs located between each said adjacent pair of primary lugs around the periphery of the tire on each side of said centerplane, and wherein at least two of said at least three secondary lugs are located on the shoulder portion of the tire.

7. The pneumatic tire defined in claim 6 wherein said secondary lugs are substantially frustoconical in shape.

8. The pneumatic tire defined in claim 6 wherein the body portion of each said primary lug extends at an angle within the range of about 45° to 65° with respect to said centerplane.

9. The pneumatic tire defined in claim 7 wherein said inner end portion of each primary lug extends at an acute angle of about 10° to 25° with respect to said centerplane and said outer end portion extends at an angle of about 110° to 130° with respect to said centerplane.

10. In a pneumatic tire for an off-the-road vehicle such as an all terrain vehicle or the like having a tread formed from an elastomeric material carried on a reinforced carcass and including an outwardly directed road engaging portion and sidewalls each terminating in a reinforced bead for mounting on a supporting wheel, the sidewalls including shoulder portions extending from said road engaging portion inwardly toward the bead, the tread extending over the road engaging portion and said shoulder portions completely around said tire, the improvement wherein said tread comprises a plurality of primary lugs arranged in sets equally spaced around the periphery of the tire on each side of the circumferential centerplane of the tire, each said set of primary lugs consisting of a long lug and a short lug, with the sets of primary lugs on each side of the centerplane being offset circumferentially by a distance substantially equal to one half the circumferential pitch of the lug sets, each said long lug including an elongated, substantially straight central body portion extending inwardly from a point adjacent said shoulder at an acute angle with respect to said centerplane and each said short lug including a curved body portion overlying and extending into adjacent edge portions of said road engaging portion and one of said shoulders, said primary lugs each including an outer end portion extending onto said shoulder at an obtuse angle relative to said centerplane, and an inner end portion extending at an acute angle relative to said centerplane which is less than the acute angle of said substantially straight body portion.

11. The pneumatic tire defined in claim 10 wherein each said straight body portion extends at an angle within the range of about 45° to 65° with respect to said centerplane.

12. The pneumatic tire defined in claim 11 wherein said inner end portion of each said primary lug extends at an angle of about 10° to 25° with respect to said centerplane.

13. The pneumatic tire defined in claim 12 wherein said outer end portion of each said primary lug extends at an angle of about 110° to 130° with respect to said centerplane.

14. The pneumatic tire defined in claim 10 further comprising a plurality of secondary lugs in the form of tapered knobs including at least one such tapered knob located on the road engaging portion between at least selected adjacent pairs of said primary lugs and at least one such tapered knob located in the shoulder portion of the tread between each adjacent pair of primary lugs around the periphery of the tire on each side of the centerplane.

15. The pneumatic tire defined in claim 14 wherein said tread comprises at least three of said tapered knobs located between each said adjacent pair of primary lugs around the periphery of the tire on each side of said centerplane, and wherein at least two of said at least three tapered knobs are located on the shoulder portion of the tire.

16. The pneumatic tire defined in claim 15 wherein said tapered knobs are substantially frustoconical in shape.

17. The pneumatic tire defined in claim 16 wherein each said substantially straight body portion extends at an angle of about 45° to 65° with respect to said centerplane.

18. The pneumatic tire defined in claim 17 wherein said inner end portion of each primary lug extends at an acute angle of about 10° to 25° with respect to said centerplane and said outer end portion extends at an angle of about 110° to 130° with respect to said centerplane.

19. The pneumatic tire defined in claim 18 wherein the spacing of said primary lugs around the periphery of the tire is substantially equal.

* * * * *